United States Patent
Um et al.

(10) Patent No.: US 7,907,186 B2
(45) Date of Patent: Mar. 15, 2011

(54) METHOD OF RECORDING STILL PICTURES ON A RECORDING MEDIUM

(75) Inventors: Soung Hyun Um, Anyang-si (KR);
Kang Soo Seo, Kyunggi-do (KR);
Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 2181 days.

(21) Appl. No.: 10/352,228

(22) Filed: Jan. 28, 2003

(65) Prior Publication Data

US 2003/0142950 A1    Jul. 31, 2003

(30) Foreign Application Priority Data

Jan. 28, 2002  (KR) .................. 10-2002-0004876

(51) Int. Cl.
*H04N 5/76* (2006.01)

(52) U.S. Cl. .................. 348/231.2; 348/222.1

(58) Field of Classification Search ............. 348/231.99, 348/231.1–231.9
See application file for complete search history.

(56) References Cited

U.S. PATENT DOCUMENTS

| | | | |
|---|---|---|---|
| 6,115,035 A | | 9/2000 | Compton et al. |
| 6,122,436 A | | 9/2000 | Okada et al. |
| 6,493,504 B1 | * | 12/2002 | Date et al. .................. 386/95 |
| 6,816,189 B2 | * | 11/2004 | Nagaoka et al. ........... 348/231.2 |
| 6,919,925 B2 | * | 7/2005 | Kudo ......................... 348/231.4 |
| 6,992,710 B2 | * | 1/2006 | Nagaoka ................... 348/231.2 |
| 6,999,674 B1 | | 2/2006 | Hamada et al. |
| 7,107,516 B1 | | 9/2006 | Anderson et al. |
| 7,158,175 B2 | * | 1/2007 | Belz et al. .................. 348/231.3 |
| 7,187,842 B2 | * | 3/2007 | Ninomiya ....................... 386/52 |
| 2001/0040862 A1 | | 11/2001 | Ando et al. |
| 2002/0135608 A1 | | 9/2002 | Hamada et al. |
| 2005/0063669 A1 | | 3/2005 | Kato et al. |

FOREIGN PATENT DOCUMENTS

| | | |
|---|---|---|
| CN | 1263672 A | 8/2000 |
| CN | 1310445 A | 8/2000 |
| CN | 1276605 A | 12/2000 |
| CN | 1300022 A | 6/2001 |
| EP | 1 059 635 A2 | 12/2000 |
| EP | 1107103 A2 | 6/2001 |
| EP | 1209680 A1 | 5/2002 |
| JP | 09-97490 A | 4/1997 |

(Continued)

OTHER PUBLICATIONS

"Design Rule for Camera File System", Version 1.0, JEIDA-49-2, Dec. 1998, 46 pages.

(Continued)

*Primary Examiner* — Gevell Selby
(74) *Attorney, Agent, or Firm* — Birch, Stewart, Kolasch & Birch, LLP

(57) ABSTRACT

The present invention relates to a method of recording still pictures onto a recording medium. The present method records still pictures onto a recording medium in a DCF (Design rule for Camera File system) structure defined for a digital still camera or in a file structure defined for a digital video recorder, creates management information to access the recorded still pictures, and writes the management information in management information fields specified in a digital video recorder. Referring to the management information, a desired still picture or desired still pictures can be found easily and rapidly among numerous still pictures recorded on a recording medium.

19 Claims, 6 Drawing Sheets

FOREIGN PATENT DOCUMENTS

| | | |
|---|---|---|
| JP | 10-013600 | 1/1998 |
| JP | 11-191282 A | 7/1999 |
| JP | 2000-4421 A | 1/2000 |
| JP | 2000-41212 A | 2/2000 |
| JP | 2000-105964 A | 4/2000 |
| JP | 2000-287163 A | 10/2000 |
| JP | 2000-333126 A | 11/2000 |
| JP | 2001-157145 | 6/2001 |
| JP | 2001-157155 A | 6/2001 |
| JP | 2001-169241 A | 6/2001 |
| JP | 2001-157146 A | 8/2001 |
| JP | 2001-211418 A | 8/2001 |
| JP | 2001-216739 A | 8/2001 |
| KR | 20000004856 A | 1/2000 |
| KR | 1020000006198 A | 1/2000 |
| KR | 20010050627 A | 6/2001 |
| WO | WO-01/11626 A1 | 2/2001 |
| WO | WO-01/82604 A1 | 11/2001 |
| WO | WO-01/82605 A1 | 11/2001 |
| WO | WO-01/82606 A1 | 11/2001 |
| WO | WO-01/82608 A1 | 11/2001 |
| WO | WO-01/82609 A1 | 11/2001 |
| WO | WO-01/82610 A1 | 11/2001 |
| WO | WO-01/82611 A1 | 11/2001 |

OTHER PUBLICATIONS

R. Menta, Archos Jukebox Multimedia-MP3 & Movie Mediabox, Archos Manuals, Dec. 14, 2001, XP-002238538.

Menta, Robert: "Archol Jukebox Multimedia—MP3 & Movie Mediabox", Archos Manuals, Dec. 14, 2001, XP002238538, www.mp3newswire.net.

"Design rule for Camera File System,", Jeita Standards, Dec. 1998, XP002238521, http://it.jeita.or.jp/jhistory/document/standard/exit_eng/jeida49eng.htm.

\* cited by examiner

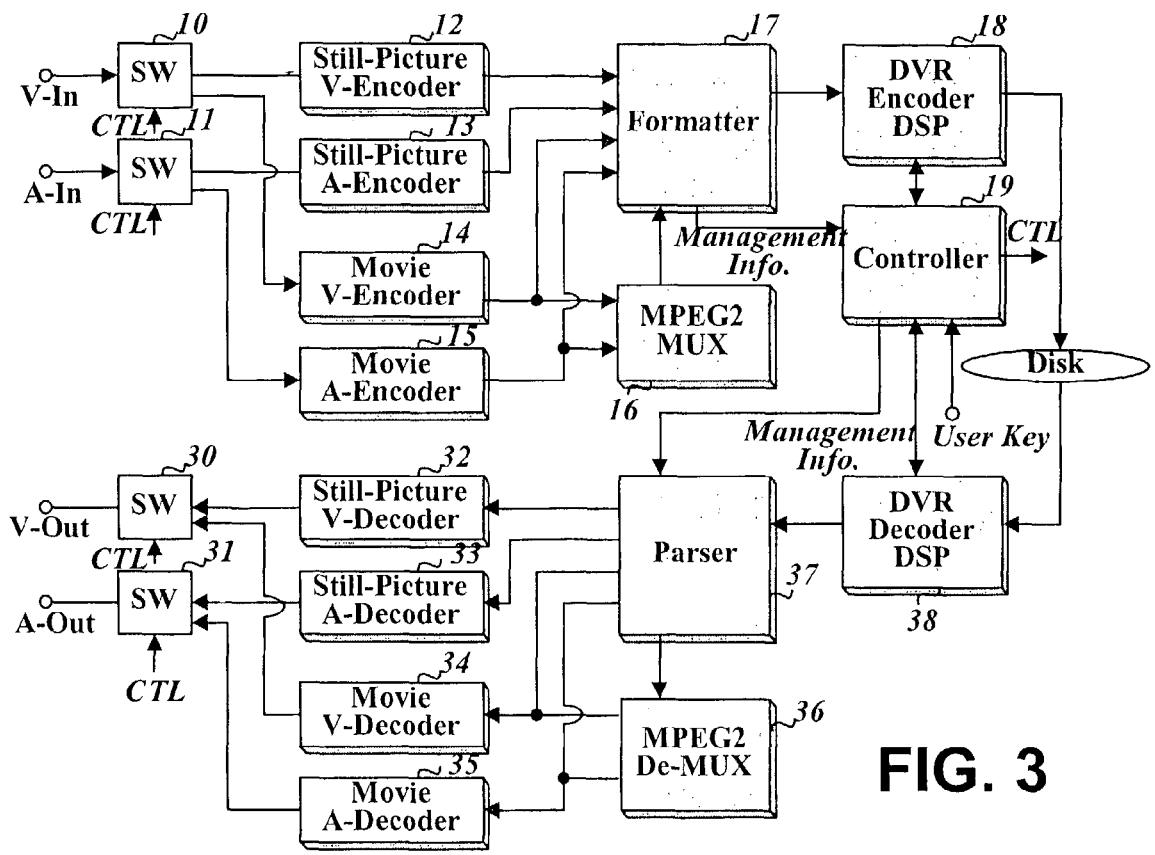
FIG. 3
FIG. 4
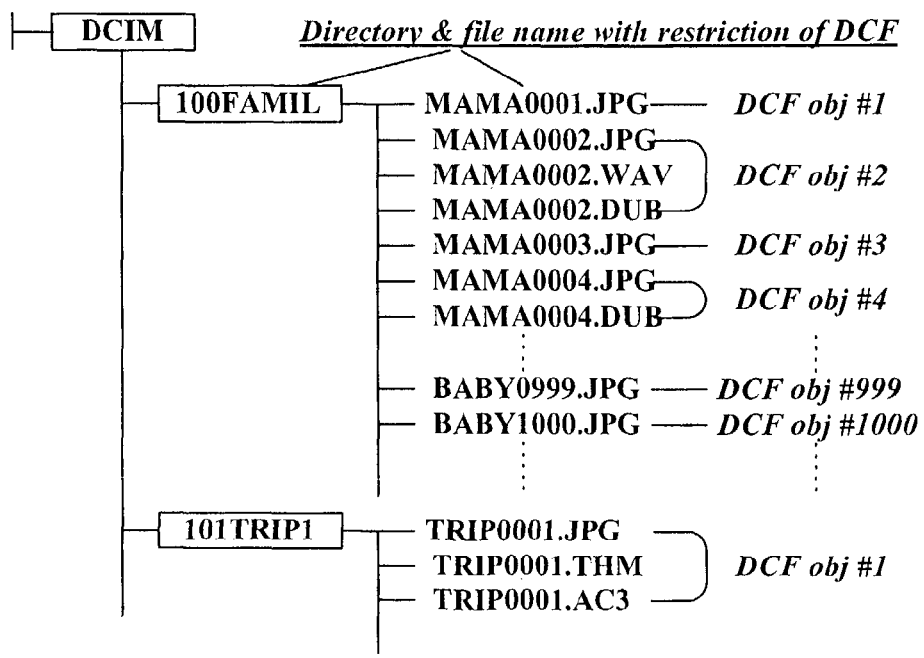

FIG. 9

Playlist file (*.rpls *.vpls)

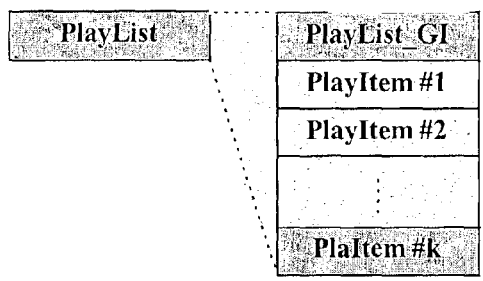
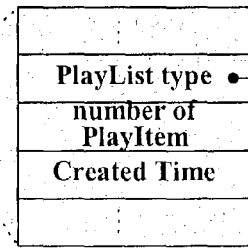

PlayList type •—— Real Playlist or Virtual Playlist
number of PlayItem
Created Time

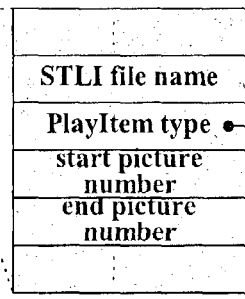

STLI file name
PlayItem type •—— Still PI
start picture number
end picture number

FIG. 10

STLI file(*.stli)

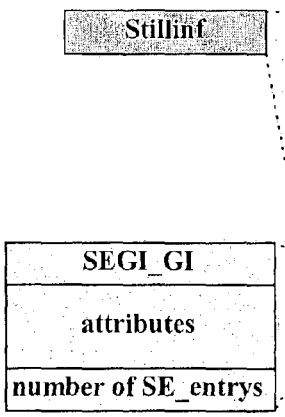
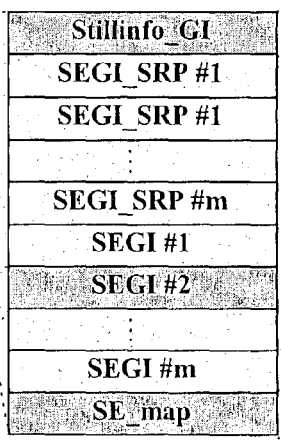
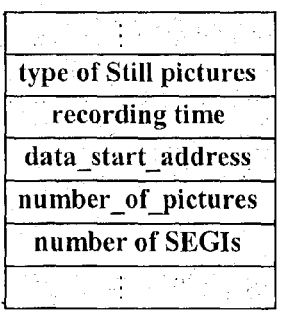

type of Still pictures
recording time
data_start_address
number_of_pictures
number of SEGIs SEGI_GI
attributes
number of SE_entrys

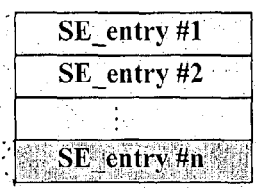

SE_entry #1
SE_entry #2
⋮
SE_entry #n type 2
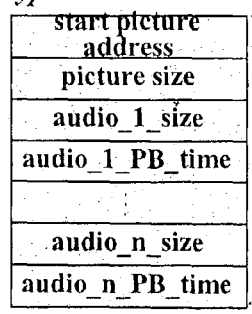
start picture address
picture size
audio_1_size
audio_1_PB_time
⋮
audio_n_size
audio_n_PB_time type 1
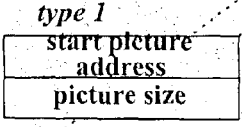
start picture address
picture size

METHOD OF RECORDING STILL PICTURES ON A RECORDING MEDIUM

BACKGROUND OF THE INVENTION

1. Field of the Invention

The present invention relates to a method of recording still pictures onto a recording medium.

2. Description of the Related Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

Recently, a Digital Still Camera (DSC) being capable of storing a taken picture in digital data has been developed. Such a DSC usually has a memory chip of large storage capacity so that it can take high-quality pictures and store audio data associated with the stored pictures as well. In a DSC, the taken pictures are encoded in the format of JPEG, or TIFF while the audio data are done in the format of PCM, u-Law PCM, or IMA-ADPCM.

A DSC has a well-known file system called 'DCF' (Design rule for Camera File system) for recording still pictures and audio data. FIG. 1 shows an illustrative DCF. In the structure of DCF, a DCIM (Digital Camera IMages) directory exists under a root directory and many subdirectories may exist under the DCIM. Each subdirectory has 8-digit-long filename that is composed of three numeric digits and five character digits. The three numeric digits should be unique, for instance, one among 100~999, and the five character digits are arbitrarily chosen by a user. Because the three numeric digits are unique the subdirectories can be created up to 900.

A subdirectory, e.g., subdirectory '100ABCDE' of FIG. 1 can accommodate many data files of which filename is 8-digits long. The filename is composed of four numeric digits and four character digits. While the four character digits are chosen by a user the four numeric digits should be unique among data files if their attributes are different. The data files are still pictures and/or audio files, respectively. The still picture files have extension of 'JPG' or 'TIF' while the audio files encoded by PCM, u-Law PCM or IMA-ADPCM have extension of 'WAV'. The filenames of the data files can be same if their extensions are different. Therefore, when a picture file is to be dubbed with audio, a dubbed audio file can be linked with the picture file only if their filenames are made same.

By the way, a digital video recorder (DVR) records video and audio data in a file structure shown in FIG. 2. The file structure of FIG. 2 has a DVR directory under a root directory. The DVR directory includes a menu file 'menu.tdat', a mark file 'mark.tdat', and their index files 'menu.tidx' and 'mark.tidx'. The menu and the mark file have menu data and mark data respectively and the index files have search data to index menu and mark data in the menu and the mark file.

The 'DVR' directory is mandatory for motion picture recording of a DVR. The 'DVR' directory has directories 'PLAYLIST', 'CLIPINF', and 'STREAM'. The 'PLAYLIST' directory includes playlist files (*.rpls,*.vpls) containing motion-picture and still-picture play items and title management information. The directory 'CLIPINF' includes clip information files (*.clpi) containing information on movie stream management and movie attribute and the directory 'STREAM' includes stream files (*.m2ts) containing actual motion-picture data stream packets.

However, it is obvious that many still pictures under the file system of FIG. 1 obtained with a DSC are moved to a recording medium of very large capacity because of relatively small storage capacity of a DSC. That is, numerous still pictures taken by a DSC will be recorded onto a large-capacity recording medium through a DVR being capable of recording data onto that medium. This fact strongly demands a DVR to record still pictures efficiently.

SUMMARY OF THE INVENTION

It is an object of the present invention to provide several methods that record still pictures onto a recording medium and create and write their management information in order to ensure efficient access.

A method of recording a still picture onto a recording medium in accordance with the present invention is characterized in that it comprises the steps of: recording still pictures onto a recording medium in a DCF (Design rule for Camera File system) structure defined for a digital still camera or in a file structure defined for a digital video recorder; and creating management information to access the recorded still pictures, and writing the management information in management information fields specified in a digital video recorder.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 3 is a block diagram of a disk device which a method of recording still pictures onto a rewritable recording medium in accordance with the present invention is embedded in;

FIGS. 4 to 6 show a schematic still-picture recording process and management information related with still picture recording in accordance with the first embodiment of the present invention; and FIGS. 7 to 10 show a schematic still-picture recording process and management information related with still picture recording in accordance with the second embodiment of the present invention.

DETAILED DESCRIPTION OF THE PREFERRED EMBODIMENT

Figure 1:
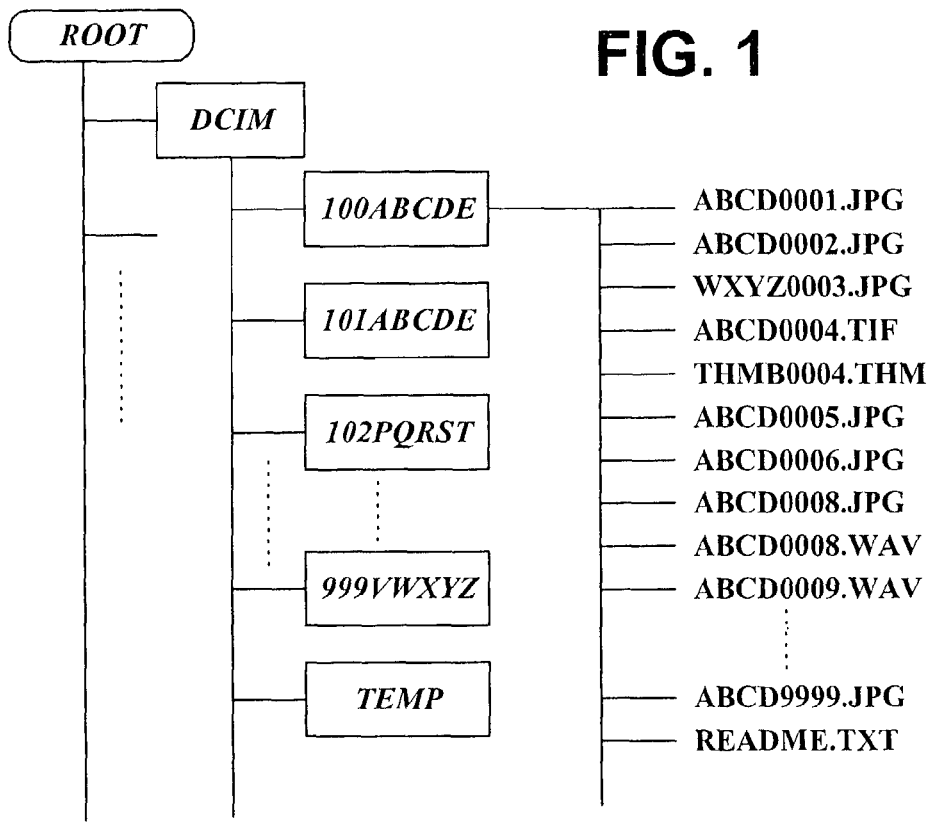
FIG. 1 shows an illustrative DCF (Design rule for Camera File system) adopted by a digital still camera.

In order that the present invention may be fully understood, a preferred embodiment thereof will now be described with reference to the accompanying drawings.

FIG. 3 is a block diagram of a disk device which a method of recording still pictures onto a rewritable recording medium in accordance with the present invention is embedded in.

The disk device of FIG. 3, e.g., a DVR can record video/audio data and management information for searching and reproduction control onto a rewritable recording medium.

The disk device comprises, as shown in FIG. 3, an input processing module, an output processing module, and a controller 19 conducting overall system control. The input processing module is composed of two input switching units 10 and 11, a still picture video 12 and a still picture audio encoder 13, a movie video 14 and a movie audio encoder 15, an MPEG 2 muxer 16, a formatter 17, and a DVR encoding DSP 18 while the output processing module is composed of two output switching units 30 and 31, a still picture video 32 and a still picture audio decoder 33, a movie video 34 and a movie audio decoder 35, an MPEG 2 demuxer 36, a parser 37, and a DVR decoding DSP 38.

The two input switching units 10 and 11 selectively connect their input signals to the still picture video 12 and the still picture audio encoder 13 or the movie video 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

For motion-picture input, a user can set a still-picture recording mode that is supported by a DVR. In that mode, MPEG2-formatted video data and AC3-, MPEG1 layer2-formatted, or LPCM audio data from the movie video 14 and the movie audio encoder 15 are applied to the formatter 17 directly not passing through the MPEG 2 muxer 16. The formatter 17 is able to convert each frame of motion pictures to still picture.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. Furthermore, the formatter 17 produces management information for searching for and controlling reproduction of the re-sized still picture video and audio data. The produced management information is delivered to the controller 19.

The formatter 17 also conducts the same resizing and management information creating operation for the still-picture video and audio data that are converted from motion picture data as explained before.

In case that the encoded motion picture video and audio data are inputted from the movie encoders 14 and 15 and the MPEG 2 stream are from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

Figure 2:
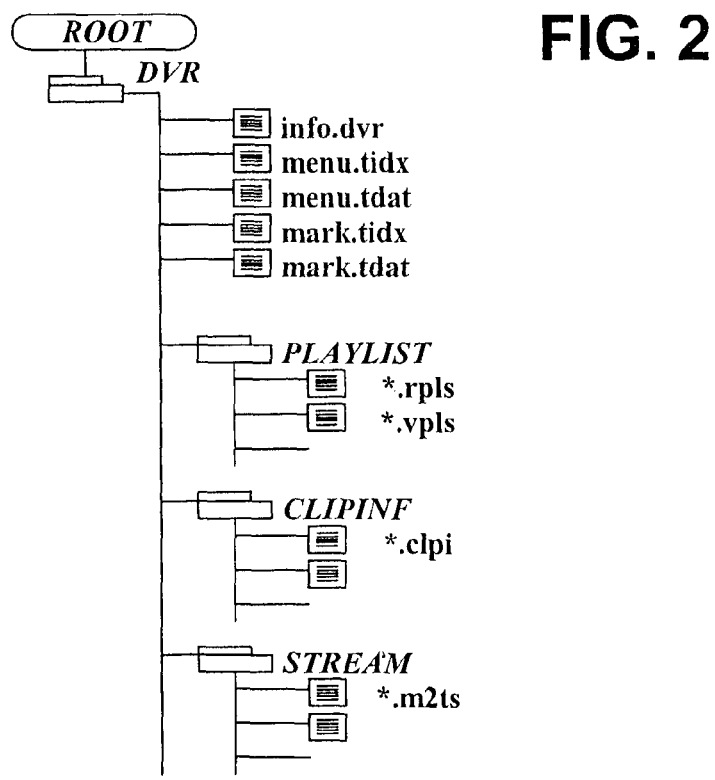
FIG. 2 shows an illustrative file system adopted by a digital video recorder.

The DVR encoding DSP 18 constructs ECC (Error Correction Code) blocks with the successive data units having still or motion pictures, thumbnails and audio data, and then modulates data of ECC blocks to corresponding recording waveforms that will form mark/space patterns on the surface of the rewritable recording disk. At this time, the controller 19 controls the DVD encoding DSP 18 to record still pictures and associated audio data and thumbnails in the DCF structure illustrated in of FIG. 1 or in the DVR file structure illustrated in FIG. 2.

The controller 17 also creates management information to access the recorded still pictures, etc. and writes it in navigation data fields defined for a DVR.

In addition, while or after video and/or audio data are recorded, the controller 19 writes the management information received from the formatter 17 or created by itself onto the rewritable recording disk through the DVR encoding DSP 18.

Below described are detailed still-picture recording methods conducted by the above-explained recording process.

Figure 5:
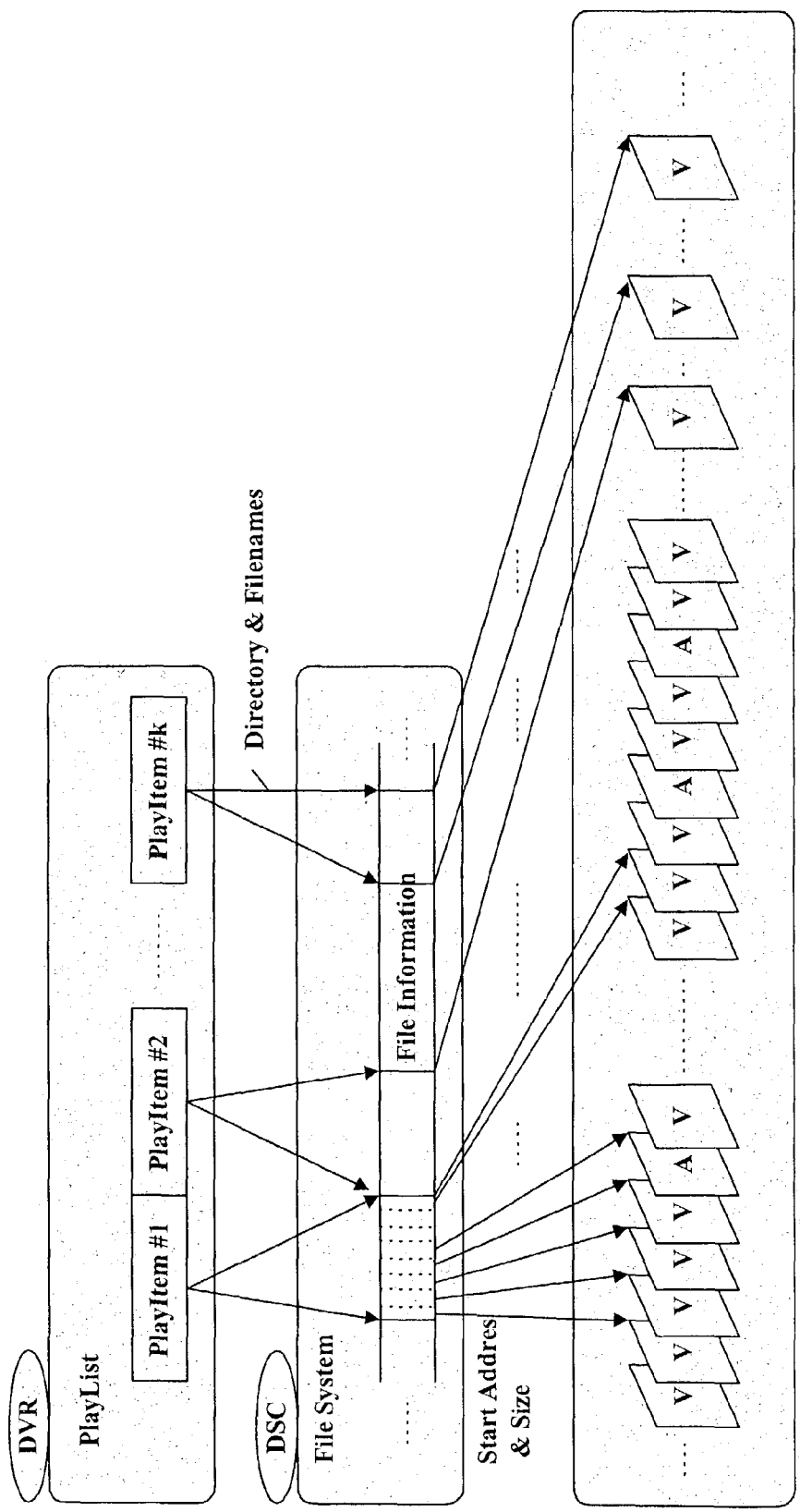
Figure 6:
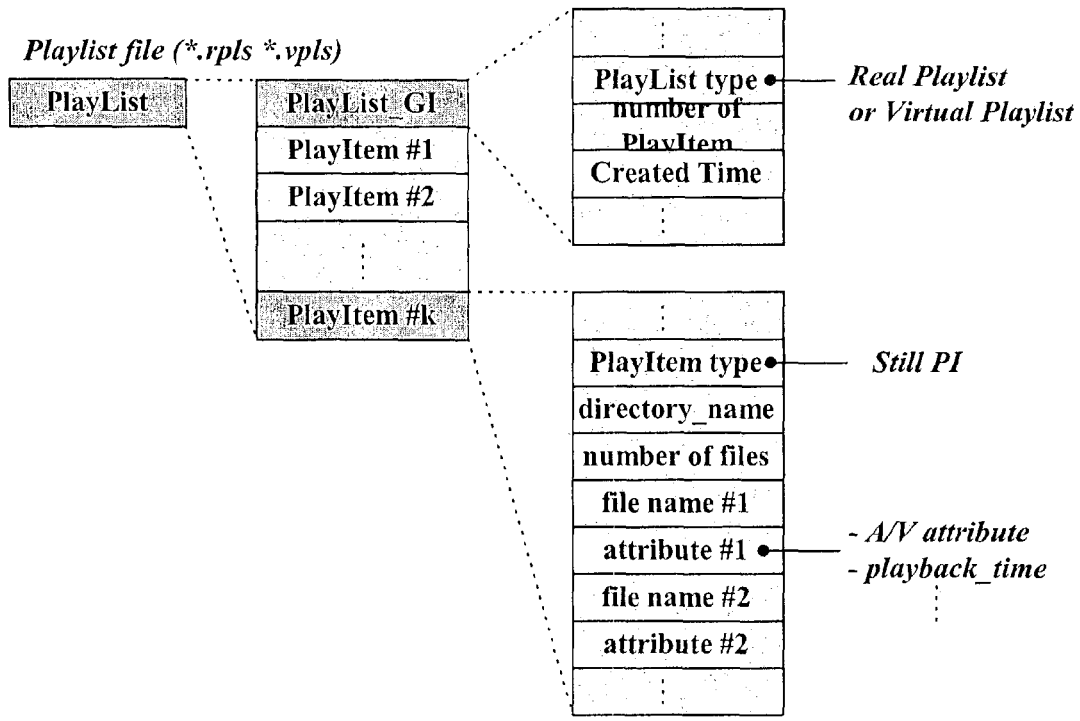

FIGS. 4 to 6 show a schematic still-picture recording process and management information related with a still picture recording in accordance with the first embodiment of the present invention. In this embodiment, the controller 17 records still pictures, and associated audio data and thumbnails, etc. in the DCF structure adopted by a DSC, as shown in FIG. 4. At this time, directories, where files are recorded, as well as still pictures, associated audio data and thumbnails are named under the rule of DCF.

That is, an arbitrary directory has its name with three numeric digits and five character digits. The three numeric digits should be unique, for instance, one among 100~999, and the five character digits are arbitrarily chosen by a user. In addition, an arbitrary recorded file has a filename, whose length is 8 digits long, composed of four numeric digits and four character digits. While the four character digits are arbitrarily chosen by a user the four numeric digits should be different from those of other files if file extensions are same.

Explaining the recording example of FIG. 4, the directory '100FAMIL' includes a still picture file 'MAMA0001.JPG', another still picture file 'MAMA0002.JPG', and a real-time audio file 'MAMA0002.WAV' and a dubbed audio file 'MAMA0002.DUB' associated with the still picture file 'MAMA0002.JPG'.

A file or files with same filename constitute a DCF object, so that the first DCF object consists of only the file 'MAMA0001.JPG' while the second DCF object consists of three files 'MAMA0002.JPG', 'MAMA0002.WAV' and 'MAMA0002.DUB'. The files constituting a DCF rule are associated each other.

The management information to use in accessing the still picture files and associated audio files, etc. recorded in the DCF structure is written in respective playitems included in a playlist defined by a DVR as shown in FIG. 5.

The playlist file (*.rpls,*.vpls), structured as FIG. 6, consists of a playlist general information 'PlayList_GI' and a plurality of playitems. The playlist general information 'PlayList_GI' includes a playlist type, the number of included playitems, created time, and so on.

The still picture files and other files of which names are respectively written in the separate playitems can be found among numerous recorded files through an adopted file system as illustrated in FIG. 5.

Each playitem includes the type of a playitem, directory name where related files are recorded, the number of files, and filename and attribute of each file member. The attribute field includes attribute of still-picture associated audio data as well as attribute of a still picture.

The still picture attribute includes a coding mode (JPEG/TIFF/MPEG), an aspect ratio (4:3/16:9), a YCrCb sampling rate (4:2:2/4:2:0), a resolution (HDTV:1920×1080/SXGA: 1280×960/XGS:1024×768/ . . . ), and the audio attribute includes a coding mode (PCM/IMA-ADPCM/AC-3/

MPEG1-L2), a sampling rate (8 kHz/11.025 kH.z/48 kHz/96 kHz/ . . . ), the number of channels (1/2/4/5.1/ . . . ), and a quantization level (8/16/24 bits).

The attribute field can further include attributes about maker, time, thumbnail, dubbed audio, and others. The maker attribute includes manufacturer's code (LG/Samsung/MEI/ . . . ), a model name, and a recording source, and the time attribute includes original creation time, etc. The thumbnail attribute is almost similar to the still picture attribute and the dubbed audio attribute is almost similar to the audio attribute as well. The other attribute includes important attributes defined in EXIF and DCF format.

Using the above-explained management information related with recorded data files, still pictures, audio data files and so on linked to a playitem selected from a playlist are easily found, through a file system, with reference to directory name and filenames written in the selected playitem as shown in FIG. 5, and are then presented sequentially.

The attribute information can be included in a still picture and an associated audio file. In this case, an electronic machine having adopted the DSC file system uses the attribute information included in still pictures and their associated audio files while another electronic machine having adopted the DVR file system uses the attribute information written in the playitems.

Figure 7:
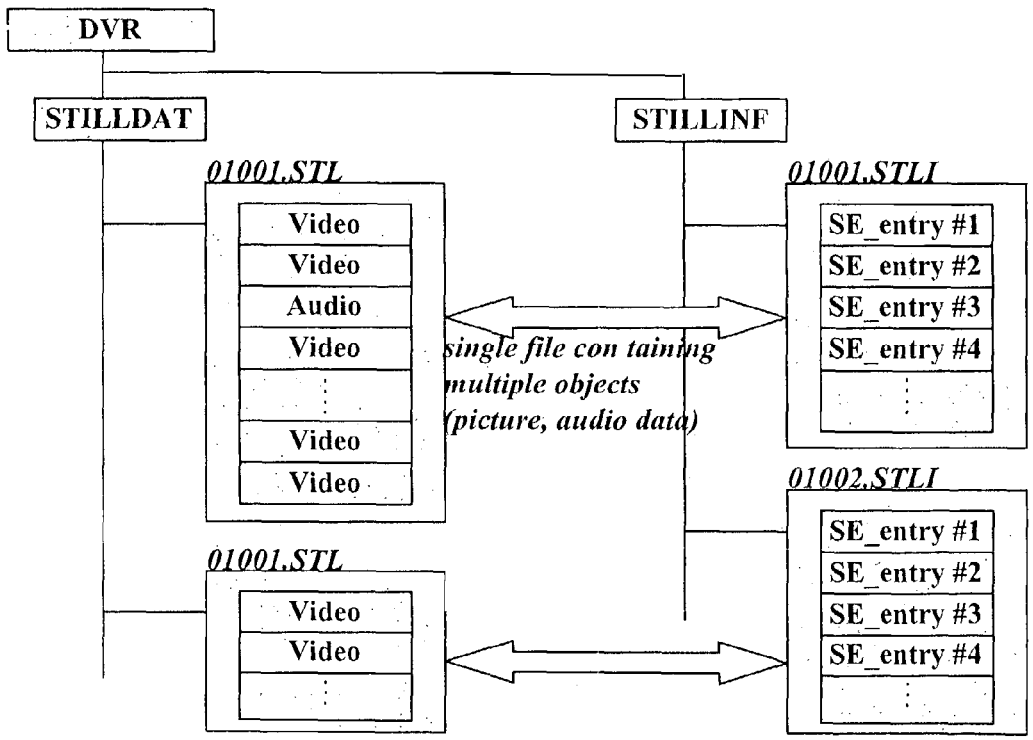
Figure 8:
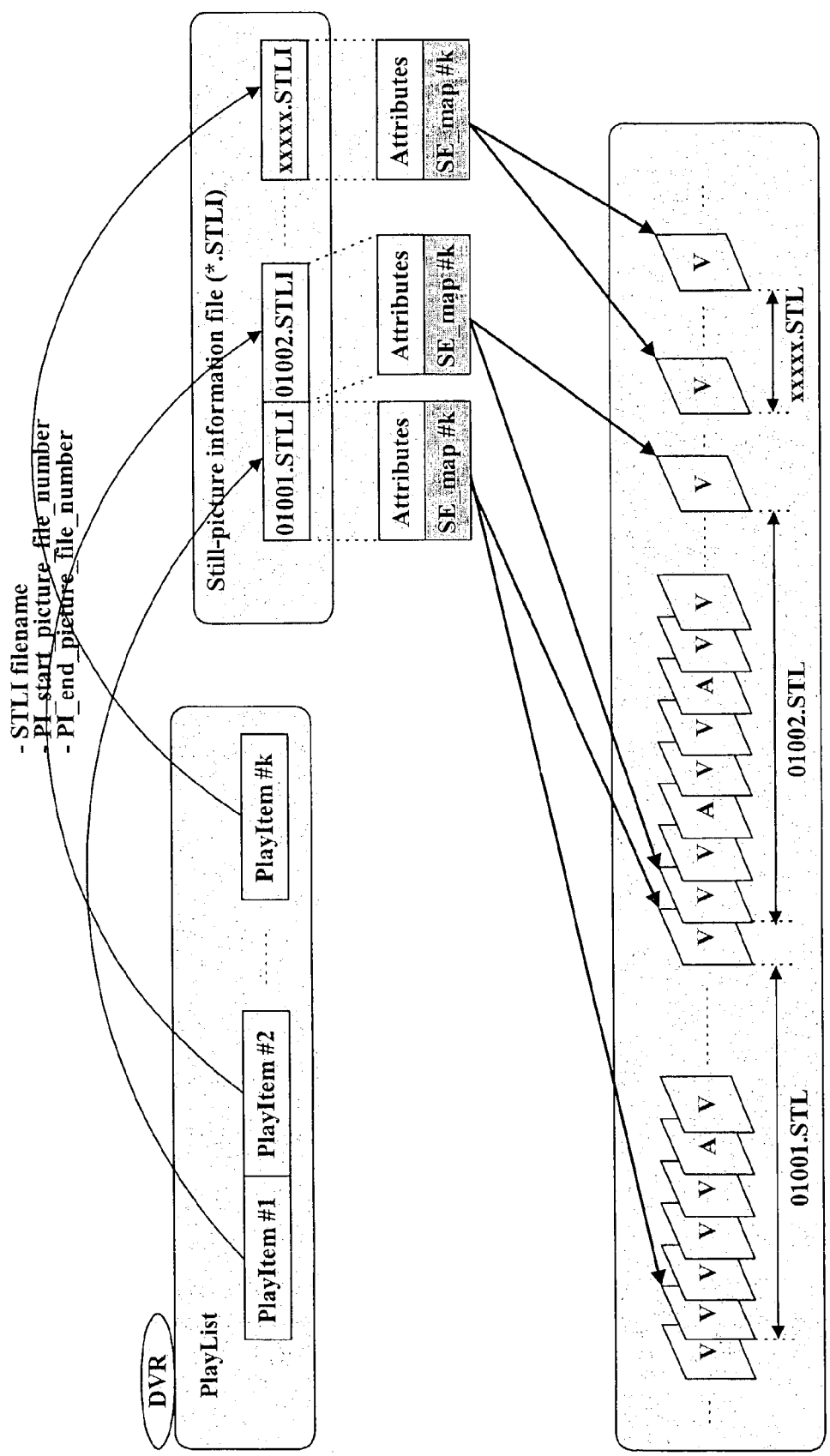

FIGS. 7 to 10 show a schematic still-picture recording process and management information related with a still picture recording in accordance with the second embodiment of the present invention. In this embodiment, still pictures, and associated audio data and thumbnails, etc. are accommodated in the DVR file structure defined by a DVR, as shown in FIG. 7. At this time, the controller 19 creates and writes the management information to use in accessing the still picture files and associated audio files, etc. in still-picture information files (*.stli) under a hnewly-created directory 'STILLINF' that is a child directory of 'DVR', as shown in FIG. 7.

Each still-picture information file is linked to each still-picture file that includes at least one data object (still picture, audio data, thumbnail, etc.), and an entry 'SE_entry' in the still-picture information file is associated with a single still picture.

A still-picture file and a still-picture information file that are associated each other use same filename with different extensions, e.g., 'stl' and 'stli'. Therefore, an associated file can be found through only filename.

The associating information, e.g., filename of a still-picture information file under the directory 'STILLINF' is written in a playitem included in a playlist specified by a DVR. As a result, each playitem is linked to each still-picture information file as shown in FIG. 9.

The playlist file (*.rpls,*.vpls) consists of a playlist general information 'PlayList_GI' and a plurality of playitems as shown in FIG. 9. The playlist general information 'PlayList_GI' includes a playlist type, the number of included playitems, created time, and so on. Each playitem includes filename of a linked still-picture information file, a playitem type, a start and an end picture number, and so forth.

The still-picture information file (*.stli), structured as shown in FIG. 10, is composed of general information of still-picture information 'Stillinfo_GI', a plurality of still-picture entry group information (SEGI) search pointers 'SEGI_SRP #k', plural pieces of SEGI 'SEGI #k', and a still-picture entry map 'SE_map'. The general information of still-picture information 'Stillinfo_GI' includes type of still pictures, recording time, a data start address, the number of pictures, the number of SEGIs, and so on.

The SEGI search pointer is to indicate a piece of still-picture entry group information that includes access information for at least one still-picture entry. Each SEGI, pointed by a SEGI search pointer, includes SEGI general information 'SEGI_GI', an attribute table, and the number of entries belonging to a concerned entry group. The attribute table includes various attributes of picture and audio data that are mentioned in detail.

Each entry of the still-picture entry map 'SE_map', as shown in FIG. 10, consists of a start address and size of a still picture, and size and playback time of at least one associated audio data object, if any.

After recording as before, if a playitem is chosen for presentation among playitems included in a playlist, the controller 19 identifies a still-picture information file linked with the chosen playitem, searches for data objects, namely, still pictures, audio data and so on using the access information written in the entry map 'SE_map', and presents respective data objects sequentially. In the data object searching operation, a file system does not intervenes because location address is used instead of filename.

Needless to say, the above-explained still-picture grouping embodiments are applicable to a disk device structured differently from the disk device of FIG. 3.

The above-explained still-picture recording method ensures a disk device to find easily and rapidly a desired still picture or desired still pictures among numerous still pictures recorded on a recording medium.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recording at least one still picture, comprising:

recording a still picture file including the at least one still picture;

recording at least one management information file, the management information file including management information, the management information indicating a starting point and an end point for reproducing the at least one still picture; and recording a still picture information file, the still picture information file including search information, wherein the management information includes attribute information and a name indicator, the attribute information including a coding mode and an aspect ratio of the at least one still picture, the name indicator identifying a filename of a still picture information file being related to the management information, and wherein the still picture file corresponds to the still picture information file, and each corresponding still picture file and still picture information file have a same file name.

2. The method of claim 1, wherein said search information includes address information.

3. The method of claim 1, wherein said attribute information is recorded in a playitem.

4. The method of claim 3, wherein said attribute information includes a coding mode and a sampling rate for audio data related to the at least one still picture.

5. The method of claim 1, further comprising:

grouping the at least one still picture based on the management information.

6. A method of reproducing at least one still picture, comprising:
 reproducing a still picture file including the at least one still picture;
 reproducing at least one management information file, the management information file including management information, the management information indicating a starting point and an end point for reproducing the at least one still picture; and
 reproducing at least one still picture information file, the still picture information file including search information,
 wherein the management information includes attribute information and a name indicator, the attribute information including a coding mode and an aspect ratio of the at least one still picture, the name indicator identifying a file name of a still picture information file being related to the management information, and
 wherein the still picture file corresponds to the still picture information file, and each corresponding still picture file and still picture information file have a same file name.

7. The method of claim 6, wherein said search information includes address information.

8. The method of claim 6, wherein said attribute information includes a coding mode and a sampling rate for audio data related to the at least one still picture.

9. The method of claim 6, wherein the at least one still picture is grouped based on the management information.

10. A non-transitory recording medium, comprising:
 a still picture file including at least one still picture recorded on the recording medium; and
 at least one management information file recorded on the recording medium, the management information file including management information, the management information indicating a starting point and an end point for reproducing the at least one still picture; and
 at least one still picture information file, the still picture information file including search information,
 wherein the management information includes attribute information and a name indicator, the attribute information including a coding mode and an aspect ratio of the at least one still picture, the name indicator identifying a file name of a still picture information file being related to the management information, and
 wherein the still picture file corresponds to the still picture information file, and each corresponding still picture file and still picture information file have a same file name.

11. The recording medium of claim 10, wherein the search information includes address information.

12. The recording medium of claim 10, wherein the attribute information includes a coding mode and a sampling rate for audio data related to the at least one still picture.

13. The recording medium of claim 10, wherein the at least one still picture is grouped based on the management information.

14. An apparatus for recording at least one still picture, comprising:
 a controller configured to control to record a still picture file including the at least one still picture; configured to control to record at least one management information file, the management information file including management information, the management information indicating a starting point and an end point for reproducing the at least one still picture; and configured to control to record at least one still picture information file, the still picture information file including search information,
 wherein the management information includes attribute information and a name indicator, the attribute information including a coding mode and an aspect ratio of the at least one still picture, the name indicator identifying a file name of a still picture information file being related to the management information, and
 wherein the still picture file corresponds to the still picture information file, and each corresponding still picture file and still picture information file have a same file name.

15. The apparatus of claim 14, wherein the attribute information includes a coding mode and a sampling rate for audio data related to the at least one still picture.

16. The apparatus of claim 14, wherein the controller is configured to control to group the at least one still picture based on the management information.

17. An apparatus for reproducing at least one still picture, comprising:
 a controller configured to control to reproduce a still picture file including the at least one still picture; configured to control to reproduce at least one management information file, the management information file including management information, the management information indicating a starting point and an end point for reproducing the at least one still picture; and configured to control to reproduce at least one still picture information file, the still picture information file including search information,
 wherein the management information includes attribute information and a name indicator, the attribute information including a coding mode and an aspect ratio of the at least one still picture, the name indicator identifying a file name of a still picture information file being related to the management information, and
 wherein the still picture file corresponds to the still picture information file, and each corresponding still picture file and still picture information file have a same file name.

18. The apparatus of claim 17, wherein the attribute information includes a coding mode and a sampling rate for audio data related to the at least one still picture.

19. The apparatus of claim 17, wherein the at least one still picture is grouped based on the management information.

* * * * *